United States Patent
Kawashima et al.

(10) Patent No.: US 8,167,453 B2
(45) Date of Patent: May 1, 2012

(54) ILLUMINATION DEVICE INCLUDING INTERCHANGEABLE SENSOR AND DECORATION MEMBERS

(75) Inventors: Toshikazu Kawashima, Kadoma (JP); Atsuo Nanahara, Kadoma (JP); Yuichi Ejiri, Kadoma (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 12/458,727

(22) Filed: Jul. 21, 2009

(65) Prior Publication Data

US 2010/0020550 A1 Jan. 28, 2010

(30) Foreign Application Priority Data

Jul. 28, 2008 (JP) ................. 2008-193549
Jul. 28, 2008 (JP) ................. 2008-193567
Jul. 28, 2008 (JP) ................. 2008-193579

(51) Int. Cl.
*F21V 23/04* (2006.01)
*F21V 21/088* (2006.01)
*H01R 13/514* (2006.01)

(52) U.S. Cl. .............. 362/221; 362/217.1; 362/225; 439/892; 439/893; 220/4.02

(58) Field of Classification Search ........... 362/221, 362/217.01, 225; 439/892, 893; 220/402
See application file for complete search history.

(56) References Cited

U.S. PATENT DOCUMENTS

| | | | | |
|---|---|---|---|---|
| 3,182,280 A * | 5/1965 | Daut et al. | ........... | 439/378 |
| 4,676,570 A * | 6/1987 | Pincherri | ........... | 439/148 |
| 5,004,867 A * | 4/1991 | Mast | ........... | 174/366 |
| 5,026,295 A * | 6/1991 | Fong et al. | ........... | 439/135 |
| 5,604,662 A * | 2/1997 | Anderson et al. | ........ | 361/679.32 |
| 5,637,002 A * | 6/1997 | Buck et al. | ........... | 439/148 |
| 6,036,535 A * | 3/2000 | Whiteman et al. | ........... | 439/519 |
| 6,135,795 A * | 10/2000 | Ho et al. | ........... | 439/135 |
| 6,182,835 B1 * | 2/2001 | Chen | ........... | 211/13.1 |
| 6,837,722 B2 * | 1/2005 | Sakamoto | ........... | 439/135 |
| 7,150,638 B1 * | 12/2006 | Fonville et al. | ........... | 439/148 |
| 7,217,146 B2 * | 5/2007 | Meister et al. | ........... | 439/148 |
| 2001/0036070 A1 * | 11/2001 | Compagnucci | ........... | 362/127 |

* cited by examiner

*Primary Examiner* — Ismael Negron
(74) *Attorney, Agent, or Firm* — Bacon & Thomas, PLLC

(57) ABSTRACT

An illumination device includes an illumination lamp installed to a device housing, a sensor for use in controlling the lighting operation of the illumination lamp, and a sensor attachment unit through which the sensor is detachably attached to the device housing such that a sensing unit of the sensor is exposed to the outside. The illumination device further includes a decoration member for attachment to the sensor attachment unit when the sensor is not attached to the sensor attachment unit, the decoration member having substantially the same outward appearance as that of the sensor. The sensor and the decoration member are interchangeably attached to the sensor attachment unit.

1 Claim, 23 Drawing Sheets

ILLUMINATION DEVICE INCLUDING INTERCHANGEABLE SENSOR AND DECORATION MEMBERS

FIELD OF THE INVENTION

The present invention relates to a sensor-detachable illumination device to which a sensor is attached in a detachable manner.

BACKGROUND OF THE INVENTION

Conventionally, there are known sensor-detachable illumination devices in which a sensor is detachably attached to a device housing (see, e.g., Japanese Patent Laid-open Publication No. 2002-110376). FIG. 25 schematically illustrates a conventional illumination device 40 as obliquely seen from below. The illumination device 40 is fixed to a ceiling or the like and includes an illumination lamp 41 such as a fluorescent tube, a sensor 42 for use in controlling the lighting operation of the illumination lamp 41 and a sensor attachment unit 44 through which the sensor 42 is attached to a device housing 43. The sensor 42 includes, e.g., a sensing unit 42a for detecting the presence of a person and a sensing unit 42b for detecting the brightness. The sensor 42 is attached to the sensor attachment unit 44 so that the sensing units 42a and 42b can be exposed to the outside.

FIGS. 26A and 26B show the external appearance of the sensor attachment unit 44 employed in the illumination device 40. FIG. 26A illustrates a state that the sensor 42 is not attached to the sensor attachment unit 44, while FIG. 26B illustrates a state that the sensor 42 is attached to the sensor attachment unit 44. As can be seen in FIGS. 26A and 26B, the illumination device 40 undergoes a remarkable change in outward appearance in the vicinity of the sensor attachment unit 44 depending on the attachment and detachment of the sensor 42. If the sensor 42 remains attached at all times, the illumination device 40 will undergoes no change in outward appearance and therefore will pose no problem in design. However, if the illumination device 40 is of the type capable of exercising a specified function without resort to the sensor 42, a problem in design is posed in that the outward appearance of the illumination device 40 varies depending on the presence or absence of the sensor 42. In other words, the sensor attachment unit 44 of the illumination device 40 is exposed in case where the sensor 42 is not attached in place. This leaves a conspicuous difference in outward appearance between the illumination device 40 without the sensor and another illumination device with a sensor. In case where an illuminating system includes a plurality of illumination devices 40, the system lacks uniformity in outward appearance and suffers from a big problem in design if the respective illumination devices 40 differ in outward appearance from one another. As a separate matter, the sensor 42 and the sensor attachment unit 44 are electrically connected to each other by a connector 44c or the like. The connector 44c remains exposed when the sensor 42 is not attached to the sensor attachment unit 44. In this state, the charging terminal of the connector 44c is exposed to the outside, meaning that a user may inadvertently touch the charging terminal of the connector 44c. This is undesirable from the standpoint of product quality and safety.

SUMMARY OF THE INVENTION

In view of the afore-mentioned problems, it is an object of the present invention to provide a sensor-detachable illumination device whose outward appearance is not conspicuously changed by the attachment and detachment of a sensor and which can prevent exposure of a charging terminal when the sensor is not attached in place.

Another object of the present invention is to provide a sensor-detachable illumination device that can keep small the change in outward appearance between a state in which a sensor block is detached from a sensor attachment unit and a state in which the sensor block is attached to the sensor attachment unit, thereby improving the design merit and assuring the reliability in remote control communication.

In accordance with an aspect of the present invention, there is provided an illumination device including: a device housing; an illumination lamp installed to the device housing; a sensor for use in controlling the lighting operation of the illumination lamp; a sensor attachment unit through which the sensor is detachably attached to the device housing such that a sensing unit of the sensor is exposed to the outside; and a decoration member for attachment to the sensor attachment unit when the sensor is not attached to the sensor attachment unit, the decoration member having substantially the same outward appearance as that of the sensor, wherein the sensor and the decoration member are interchangeably attached to the sensor attachment unit.

In accordance with another aspect of the present invention, there is provided an illumination device including: a device housing; an illumination lamp installed to the device housing; a sensor for use in controlling the lighting operation of the illumination lamp; a sensor attachment unit through which the sensor is detachably attached to the device housing, the sensor attachment unit having a connector; and a decoration member attached to the sensor attachment unit, the decoration member serving to cover the sensor with a sensing unit of the sensor exposed to the outside when the sensor is attached to the sensor attachment unit, and to hide the connector of the sensor attachment unit when the sensor is not attached to the sensor attachment unit.

In accordance with still another aspect of the present invention, there is provided an illumination device including: a device housing; a remote control signal receiving unit for receiving a remote control signal transmitted from a remote control terminal; a sensor block detachably attached to the device housing and exposed from the device housing; and a sensor attachment unit provided in the device housing for holding the sensor block in place, the sensor attachment unit having a connector, wherein the sensor attachment unit has a surface substantially flush with a surface of the remote control signal receiving unit when the sensor block is not attached to the sensor attachment unit, wherein the sensor block overlaps with the surface of the remote control signal receiving unit when the sensor block is attached to the sensor attachment unit, and wherein the sensor block includes a conduction portion for delivering the remote control signal, the conduction portion being formed in the portion of the sensor block overlapping with the surface of the remote control signal receiving unit.

DETAILED DESCRIPTION OF THE PREFERRED EMBODIMENTS

Figure 1:
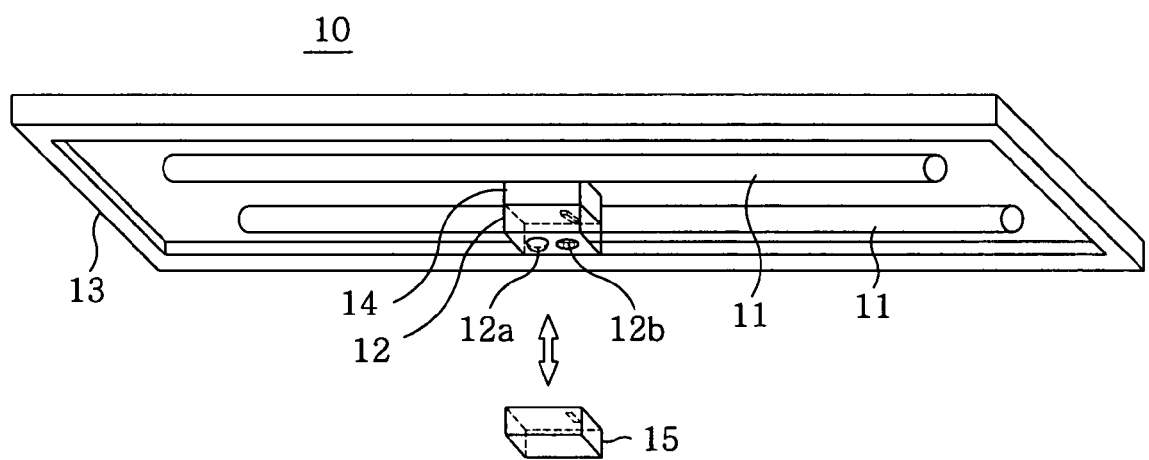
FIG. 1 is a perspective view showing a sensor-detachable illumination device in accordance with a first embodiment of the present invention.

Hereinafter, preferred embodiments of the present invention will be described in detail with reference to the accompanying drawings. In the following description, the elements with the same function and configuration will be designated by like reference characters and redundant descriptions thereof will be omitted.

First Embodiment

FIG. 1 shows the schematic configuration of a sensor-detachable illumination device (hereinafter referred to as "illumination device") 10 in accordance with a first embodiment of the present invention, which view is obliquely seen from below. The illumination device 10 includes an illumination lamp 11 serving as a light source, a sensor (e.g., a plug-in sensor) 12 for the lighting control of the illumination lamp 11, a device housing 13 and a sensor attachment unit 14 through which to detachably attach the sensor 12 to the device housing 13. The sensor 12 is attached to the sensor attachment unit 14 so that sensing units 12a and 12b thereof can be exposed to the outside. The illumination device 10 further includes a decoration member 15 having substantially the same external appearance as that of the sensor 12. The decoration member 15 is attached to the sensor attachment unit 14 when the sensor 12 is not attached to the latter. In other words, the sensor 12 and the decoration member 15 are interchangeably attached to the sensor attachment unit 14.

As the illumination lamp 11, a fluorescent tube, an incandescent light bulb, a light emitting diode (LED) lamp or the like can be used. The illumination device 10 includes a lighting control circuit for controlling the illumination lamp 11 based on an output signal of the sensor 12 in the device housing 13. The control of the illumination lamp 11 includes on-off control, phase control, pulse width control, amplitude control and the like.

The sensor 12 includes, for example, a human sensor and/or a brightness sensor. The human sensor includes, e.g., a pyroelectric element for sensing infrared rays, and detects the presence of a person within a specified range by sensing infrared rays emitted from a body of the person. The brightness sensor includes, e.g., a photodiode whose output current varies depending on brightness, and measures brightness within a measurement range. The sensor 12 is not limited to the human sensor or the brightness sensor.

Figure 2A:
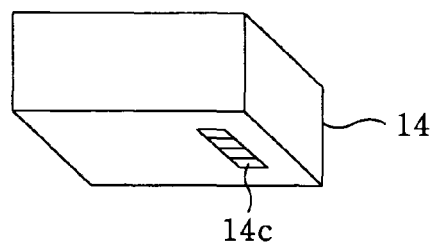
FIG. 2A is a perspective view showing a sensor attachment unit employed in the illumination device of the first embodiment.
Figure 2B:
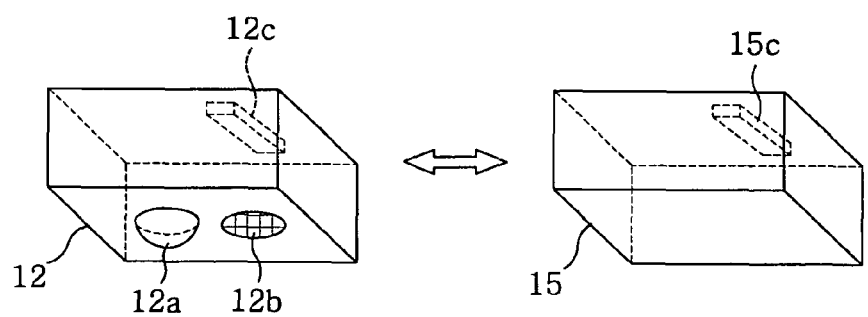
FIG. 2B is a perspective view showing a sensor and a decoration member employed in the illumination device of the first embodiment.

FIG. 2A shows the external appearance of the sensor attachment unit 14, and FIG. 2B depicts the external appearance of the sensor 12 and the decoration member 15. The sensor attachment unit 14 serves as an installation base through which the sensor 12 is detachably attached to the device housing 13. The sensor attachment unit 14 is provided on the lower surface of the device housing 13. The sensor attachment unit 14 and the sensor 12 are provided with holder structures by which the sensor 12 is held in the sensor attachment unit 14. As the holder structures, it may be possible to use, e.g., mutually separable engagement structures formed in the sensor 12 and the sensor attachment unit 14 or magnetically couplable structures including a permanent magnet and an iron piece.

The sensor 12 and the sensor attachment unit 14 are provided with a connector 12c and a connector 14c, respectively. The connectors 12c and 14c include a power supply terminal for supplying an electric current from the device housing 13 to the sensor 12 through the sensor attachment unit 14 and a signal terminal for transmitting an output signal from the sensor 12 to the lighting control circuit in the device housing 13 through the sensor attachment unit 14. The connectors 12c and 14c are electrically connected to each other when the sensor 12 is attached to the sensor attachment unit 14. The power supply terminal of the connector 14c serves as a charging terminal, so that it is preferable to use the connector 14c as a female connector and the connector 12c as a male connector so as to prevent the charging terminal from protruding from the sensor attachment unit 14. Further, the connectors 12c and 14c can also serve as a holding structure for keeping the sensor 12 attached to the sensor attachment unit 14.

For example, as shown in FIG. 2B, the sensing units 12a and 12b of the sensor 12 function as the human sensor and the brightness sensor, respectively. In the state where the sensor 12 is attached to the sensor attachment unit 14, the sensing units 12a and 12b are exposed to detect infrared rays and visible rays, respectively.

The decoration member 15 has substantially the same shape as that of the sensor 12 but has no function as a sensor. The decoration member 15 is provided with a coupling portion 15c for mechanical connection to the sensor attachment unit 14. In the state where the decoration member 15 is attached to the sensor attachment unit 14, the connector 14c of the sensor attachment unit 14 is covered by an insulating material of which the decoration member 15 is made.

With the illumination device 10 configured as above, the lighting operation of the illumination lamp 11 is controlled by the output signal of the sensor 12 while the sensor 12 remains attached to the sensor attachment unit 14. For example, if the sensing unit 12a of the sensor 12 detects a person, the illumination device 10 lights up the illumination lamp 11 and keeps the illuminance constant by controlling the dimming rate of the illumination lamp 11 so that the brightness measured by the sensing unit 12b of the sensor 12 becomes constant. If the sensing unit of the sensor 12 fails to detect a person for a predetermined time, the illumination device 10 extinguishes the illumination lamp 11 to save energy. When the decoration member 15 is attached to the sensor attachment unit 14 instead of the sensor 12, the illumination lamp 11 is turned on or off by the on-off operation of the electric power supplied to the illumination device 10 or by the control signal fed from other illumination devices.

Figure 2C:
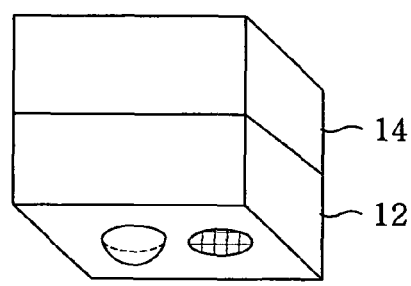
FIG. 2C is a perspective view showing the sensor attachment unit to which the sensor is attached.
Figure 2D:
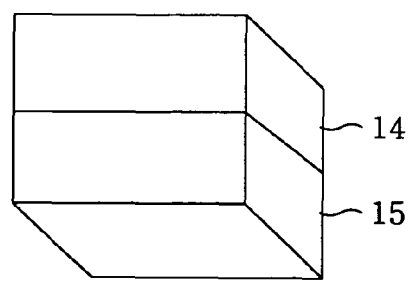
FIG. 2D is a perspective view showing the sensor attachment unit to which the decoration member is attached.

Shown in FIGS. 2C and 2D is the external appearance of the sensor attachment unit 14 and its vicinity in the illumination device 10. FIG. 2C illustrates the sensor attachment unit 14 to which the sensor 12 is attached, and FIG. 2D depicts the sensor attachment unit 14 to which the decoration member 15 is attached. The outward appearance of the decoration member 15 is substantially the same as that of the sensor 12. The outward appearance of the illumination device 10 in which the decoration member 15 is attached to the sensor attachment unit 14 is substantially the same as that of the illumination device 10 in which the sensor 12 is attached to the sensor attachment unit 14. When the decoration member 15 is attached to the sensor attachment unit 14, the connector 14c of the sensor attachment unit 14 is covered with the decoration member 15, thereby keeping the charging terminal thereof against exposure.

In the illumination device 10 of the present embodiment described above, the sensor 12 and the decoration member 15, both of which have substantially the same outward appearance, are interchangeably attached to the sensor attachment unit 14. This ensures that the outward appearance of the illumination device 10 is not conspicuously changed by the attachment and detachment of the sensor 12. When the sensor 12 is not attached in place, the decoration member 15 covers the charging terminal of the sensor attachment unit 14 to prevent exposure of the charging terminal, thereby improving safety as well as the design of the illumination device 10. The decoration member 15 is structurally simple and can be produced in a cost-effective manner, because it does not have any sensor function but merely makes mechanical connection with the sensor attachment unit 14.

Second Embodiment

Figure 3:
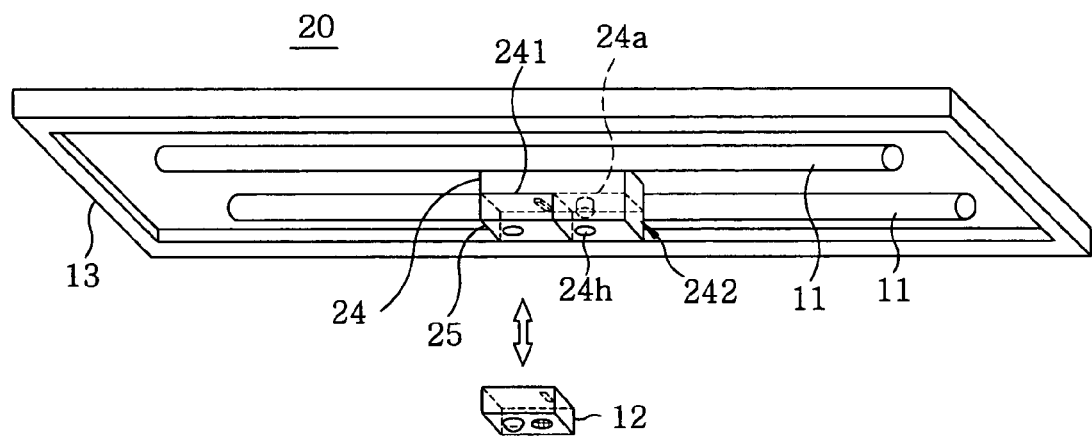
FIG. 3 is a perspective view showing a sensor-detachable illumination device in accordance with a second embodiment of the present invention.

FIG. 3 shows the schematic configuration of a sensor-detachable illumination device 20 in accordance with a second embodiment of the present invention. The illumination device 20 of the present embodiment differs from that of the first embodiment in terms of the configuration of a sensor attachment unit 24 and a decoration member 25. The sensor attachment unit 24 includes an installation base 241 to which is attached the sensor 12 or the decoration member 25 having substantially the same outward appearance as that of the sensor 12, and an accommodation portion 242 arranged at one side of the installation base 241 for slidably accommodating the decoration member 25.

The sensor attachment unit 24 further includes a remote control interface 24a provided within the accommodation portion 242 for receiving a remote control signal used in controlling the illumination device 20 with a remote controller. A hole portion 24h through which to pass the remote control signal is formed on the lower surface of the accommodation portion 242.

FIGS. 4A through 4D illustrate the time-series sequence in which the sensor 12 is attached to the sensor attachment unit 24. The decoration member 25 is slidably accommodated within the accommodation portion 242 when the sensor 12 is attached to the installation base 241.

Figure 4A:
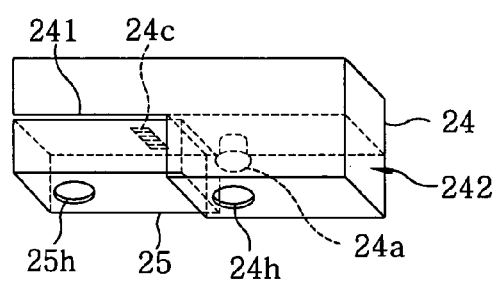
FIGS. 4A through 4D are perspective views illustrating the time-series sequence in which a sensor is attached to a sensor attachment unit in the illumination device of the second embodiment.

When the sensor 12 is not attached to the sensor attachment unit 24 as shown in FIG. 4A, the decoration member 25 is slidingly drawn out of the accommodation portion 242 and fixed to the installation base 241. The connector 24c of the sensor attachment unit 24 for use in connecting the sensor 12 is covered with the decoration member 25, thus keeping the charging terminal of the connector 24c against exposure.

Figure 4B:
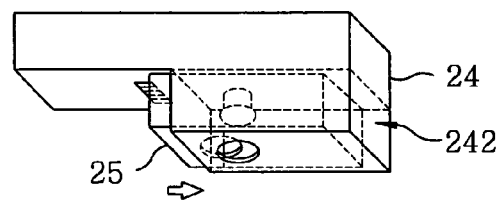

Referring next to FIG. 4B, the decoration member 25 is slidingly pushed into the accommodation portion 242 having a cavity formed therein.

Figure 4C:
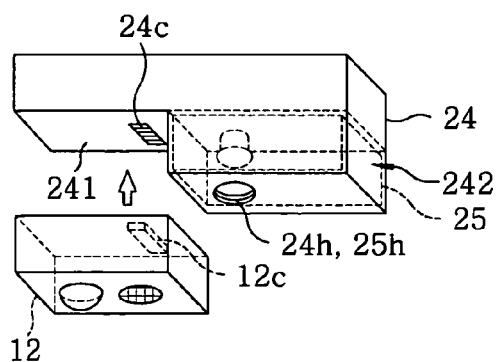

If the decoration member 25 is completely accommodated within the accommodation portion 242 as shown in FIG. 4C, the installation base 241 of the sensor attachment unit 24 comes into an exposed state. Then the sensor 12 is attached to the installation base 241. The decoration member 25 has a hole portion 25h through which to feed a remote control signal to the remote control interface 24a. The hole portion 25h of the decoration member 25 overlaps in position with the hole portion 24h of the accommodation portion 242 when the decoration member 25 is accommodated within the accommodation portion 242.

Figure 4D:
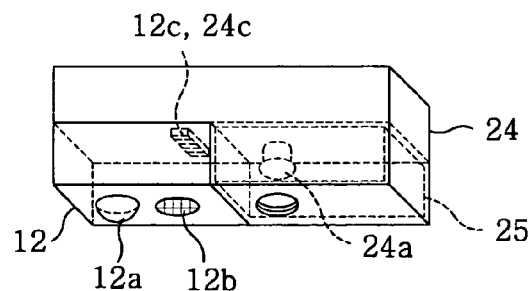

Referring next to FIG. 4D, the sensor 12 is attached to the installation base 241 of the sensor attachment unit 24 so that the connectors 12c and 24c can be connected to each other. The sensing units 12a and 12b of the sensor 12 remain exposed on the surface of the illumination device 20. Since the outward appearance of sensor 12 and the decoration member 25 is substantially identical, the outward appearance of the illumination device 20 in which the sensor 12 is attached to the sensor attachment unit 14 is substantially the same as that of the illumination device 20 in which the decoration member 25 is attached to the sensor attachment unit 14. The sensor 12 can be interchanged with the decoration member 25 in the order opposite to the afore-mentioned order.

Figure 5A:
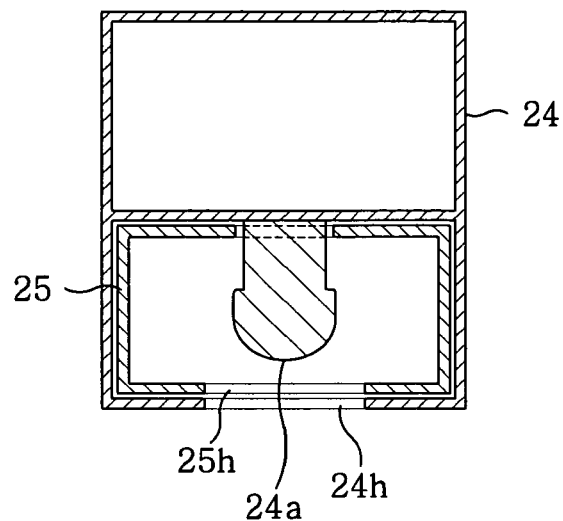
FIG. 5A is a section view of the sensor attachment unit employed in the illumination device of the second embodiment.
Figure 5B:
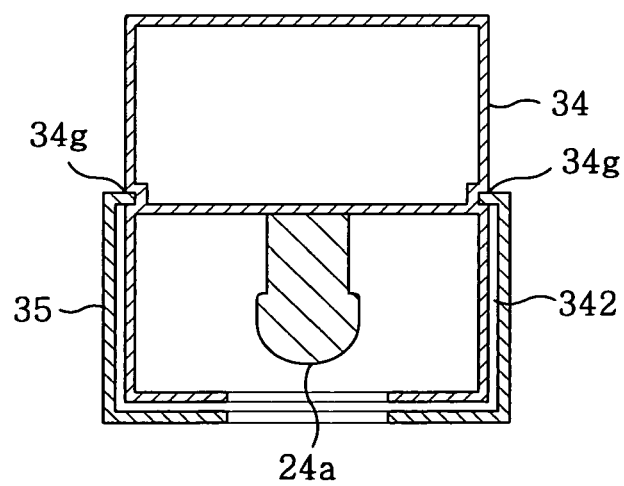
FIG. 5B is a section view of a modified example of the sensor attachment unit employed in the illumination device of the second embodiment.

Next, description will be made on the sliding configuration of the decoration member 25 in the illumination device 20 of the second embodiment. FIG. 5A is a section view of the sensor attachment unit 24 taken along the direction perpendicular to the sliding direction thereof, and FIG. 5B is a section view showing a sensor attachment unit 34 as a modified example of the sensor attachment unit 24. In these figures, the interior of the upper half of each of the sensor attachment units 24 and 34 are omitted from illustration. Referring to FIG. 5A, the sensor attachment unit 24 and the decoration member 25 are configured so that the decoration member 25 can be slidably held inside the accommodation portion 242 of the sensor attachment unit 24. Referring next to FIG. 5B, the decoration member 35 is slidably held outside the accommodation portion 342 of the sensor attachment unit 34. In this configuration, the sensor attachment unit 34 has elongate groove portions 34g formed on the side surfaces thereof to extend in the sliding direction. The decoration member 35 engages at its upper end with the groove portions 34g for the sliding movement.

With the illumination device 20 of the present embodiment described above, the decoration member 25 is slidably accommodated within the accommodation portion 242 when the sensor 12 is attached in place. This enhances the ease of attachment and detachment of the sensor 12 and prevents the decoration member 25 from being lost.

In the aforementioned embodiments, the sensor 12 and the decoration member 15, 25 or 35 are not limited to the rectangular parallelepiped shape but may have other shapes, e.g., a polygonal columnar shape, an elliptical columnar shape and a hemispherical shape, insofar as they are substantially identical in shape.

Third Embodiment

A sensor-detachable illumination device 100 in accordance with a third embodiment of the present invention will now be described with reference to FIGS. 6 through 11C.

Figure 6:
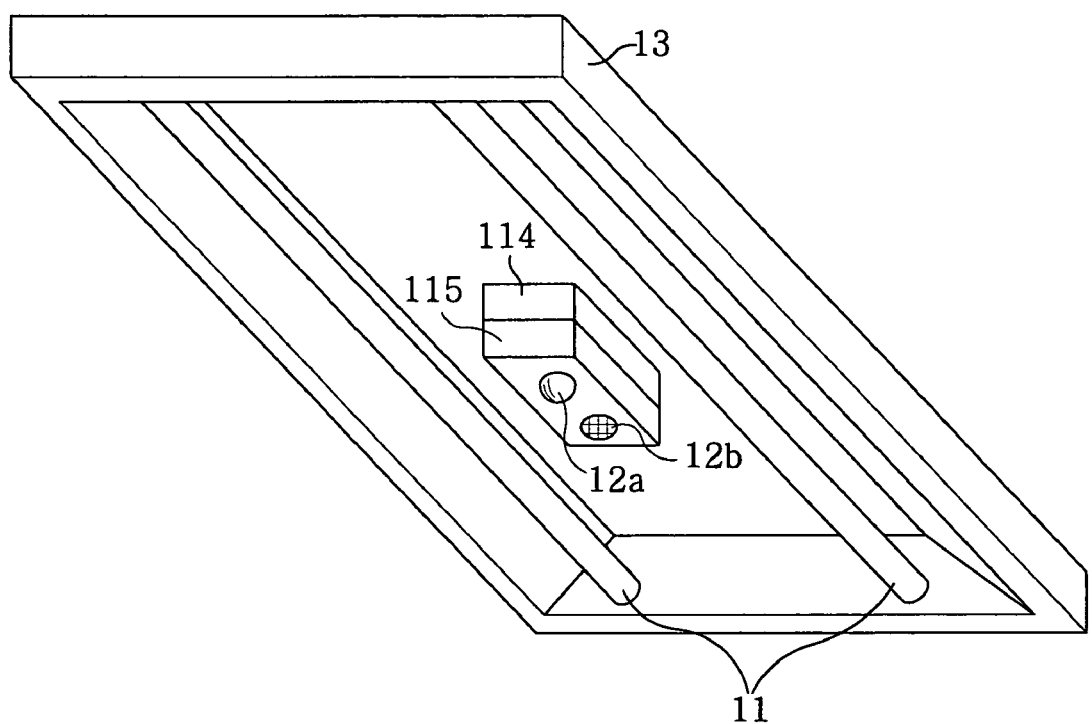
FIG. 6 is a perspective view of a sensor-detachable illumination device in accordance with a third embodiment of the present invention.
Figure 7:
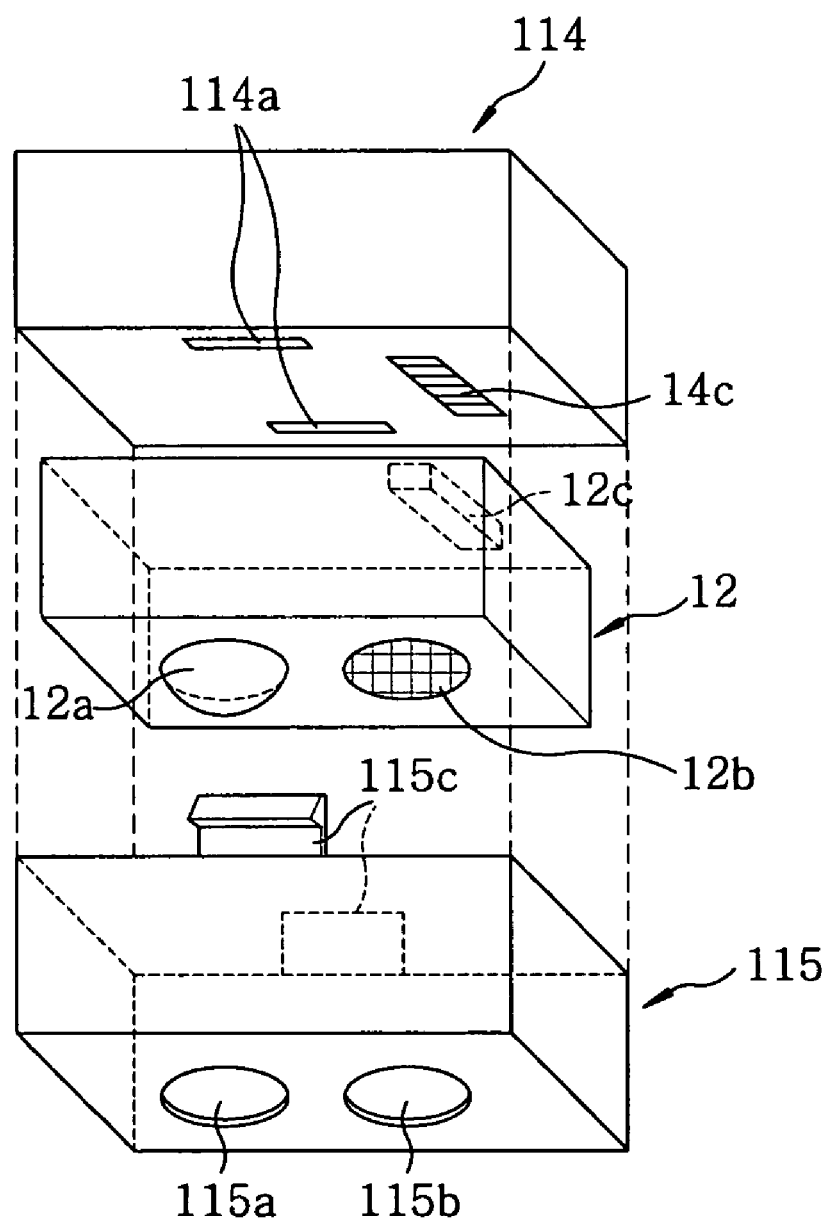
FIG. 7 is a perspective view showing a sensor, a sensor attachment unit and a decoration member employed in the sensor-detachable illumination device of the third embodiment.

FIG. 6 shows the external appearance of the illumination device 100 of the third embodiment, and FIG. 7 shows the external appearance of the sensor 12, a sensor attachment unit 114 and a decoration member 115. The illumination device 100 includes an illumination lamp 11, the sensor 12 for the lighting control of the illumination lamp 11, the sensor attachment unit 114 through which to detachably attach the sensor 12, the decoration member 115 detachably attached to the sensor attachment member 114 to cover the sensor attached to the sensor attachment member 114, and the device housing 13 holding the illumination lamp 11 and the sensor attachment member 114.

In the present embodiment, the sensor attachment unit 114 has claw reception holes 114a for use in holding the decoration member 115 and is provided on the lower surface of the device housing 13. The sensor 12 and the sensor attachment unit 114 are provided with holder structures by which the sensor 12 is held in the sensor attachment unit 114. As the holder structures, it may be possible to use, e.g., mutually separable engagement structures formed in the sensor 12 and the sensor attachment unit 114 or magnetically couplable structures including a permanent magnet and an iron piece. Alternatively, the connectors 12c and 14c may serve as the holder structures for holding the sensor 12 in the sensor attachment unit 114.

The decoration member 115 has an open-top and closed-bottom box shape and is provided with through-holes 115a and 115b formed in such positions as to correspond to the sensing unit 12a and the sensing unit 12b when the sensor 12 is attached to the sensor attachment unit 114. Additionally, the decoration member 115 is provided with claw portions 115c for engagement with the claw reception holes 114a. The claw portions 115c are formed in such positions as to correspond to the claw reception holes 114a of the sensor attachment unit 114. If the through-holes 115a and 115b are too conspicuous when the decoration member 115 is attached to the sensor attachment unit 114 with the sensor 12 detached, it may be possible to close the through-holes 115a and 115b through the use of lids. The lids may be removed when the sensor 12 is attached to the sensor attachment unit 114.

Figure 8A:
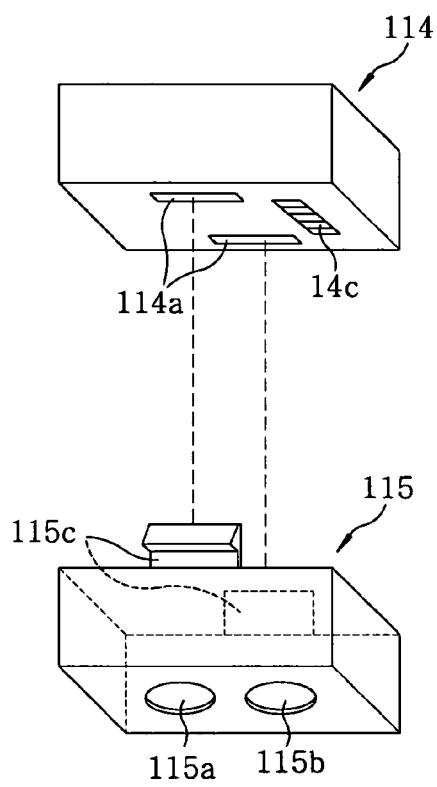
FIGS. 8A and 8B are perspective views, as seen from different sides, of the sensor attachment unit and the decoration member employed in the illumination device of the third embodiment.
Figure 8B:
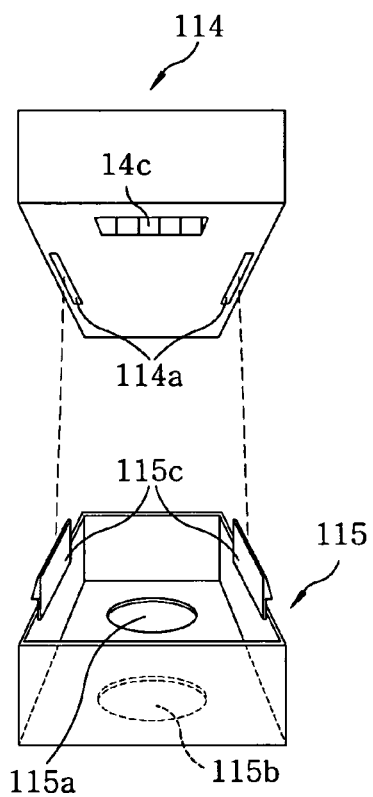

FIGS. 8A and 8B show the outward appearance of the sensor attachment unit 114 and the decoration member 115 with the sensor 12 removed. In order to attach the decoration member 115 to the sensor attachment unit 114, the claw portions 115c of the decoration member 115 are inserted into and coupled with the claw reception holes 114a of the sensor attachment unit 114. For removal of the decoration member 115 from the sensor attachment unit 114, the side surfaces of the decoration member 115 having the claw portions 115c are pressed and inwardly flexed to thereby release the engagement of the claw portions 115c and the claw reception holes 114a.

Figure 9:
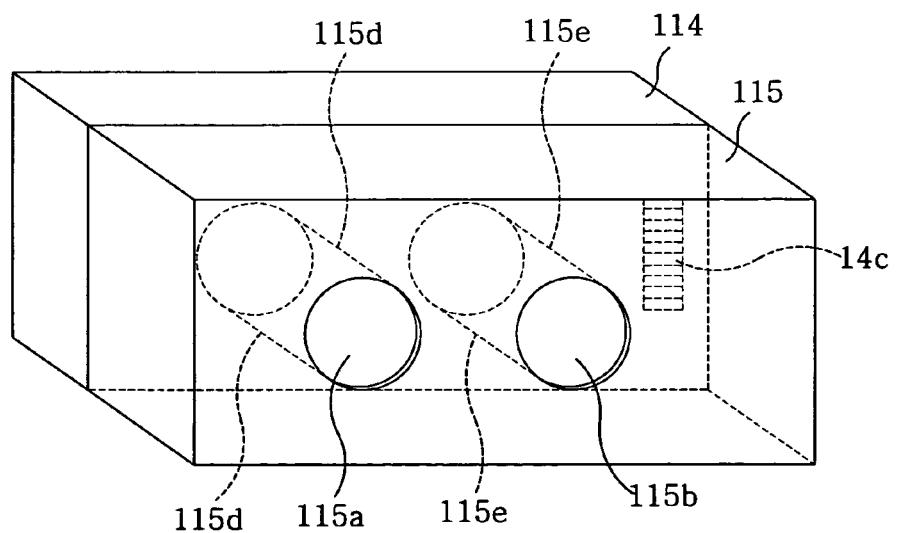
FIG. 9 is a perspective view depicting a state that normal lines are drawn from the through-holes of the decoration member to the sensor attachment unit in the illumination device of the third embodiment.
Figure 10:
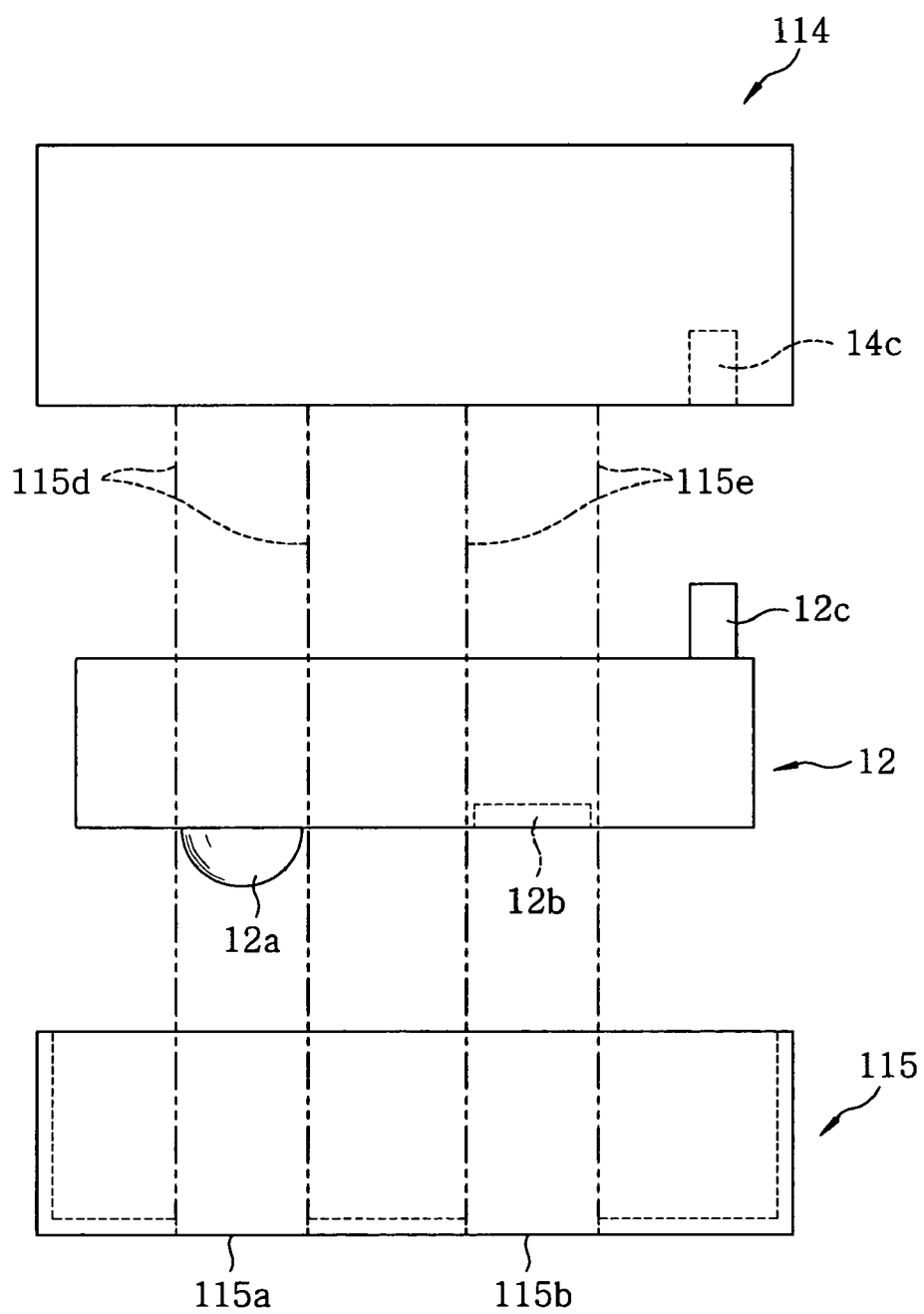
FIG. 10 is a side view depicting a state that normal lines are drawn from the through-holes of the decoration member to the sensor attachment unit in the illumination device of the third embodiment.

FIGS. 9 and 10 depicts the positional relationship between the normal lines 115d and 115e drawn from the through-holes 115a and 115b of the decoration member 115 and the connector 14c of the sensor attachment unit 114. The connector 14c is installed in such a position as not to make contact with the normal lines 115d and 115e, that is, not to overlap with the through-holes 115a and 115b. Therefore, even if a user inserts his or her fingers into the through-holes 115a and 115b of the decoration member 115 with the sensor 12 removed from the sensor attachment unit 114, the fingers are hard to touch the connector 14c of the sensor attachment unit 114. This helps enhance the safety.

Figure 11A:
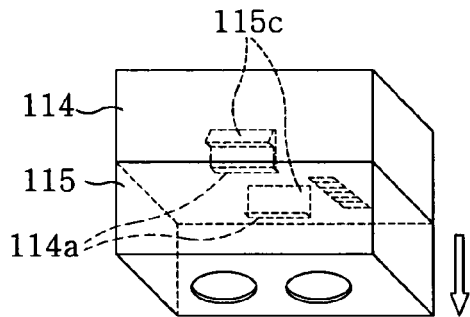
FIGS. 11A through 11C are perspective views illustrating the time-series sequence in which the sensor is attached to the sensor attachment unit in the illumination device of the third embodiment.
Figure 11B:
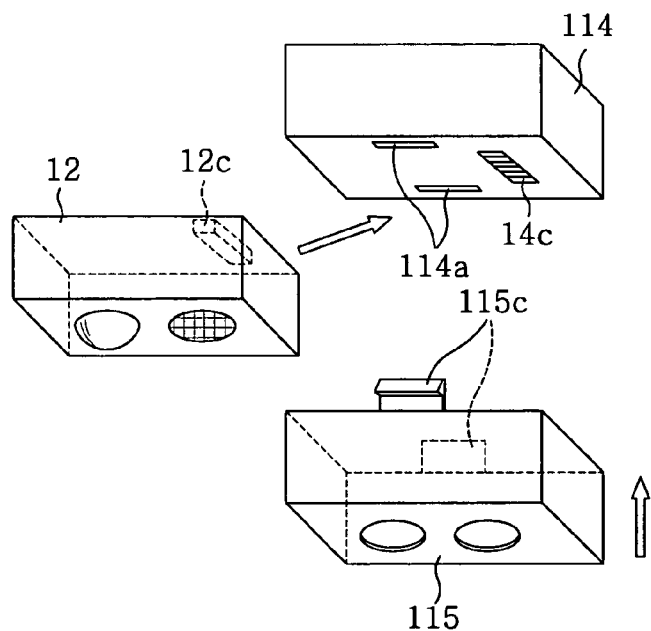
Figure 11C:
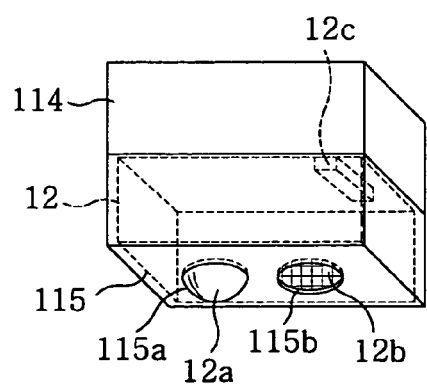

FIGS. 11A through 11C illustrate the time-series sensor attachment sequence starting with the state in which the decoration member 115 alone is attached to the sensor attachment unit 114 and ending with the state in which both the sensor 12 and the decoration member 115 are attached to the sensor attachment unit 114. As shown in FIG. 11A, the decoration member 115 is detached from the sensor attachment unit 114 as the claw portions 115c is disengaged from the claw reception holes 114a. Referring next to FIG. 11B, the sensor 12 is attached to the sensor attachment unit 114, and the connector 12c is electrically connected to the connector 14c. Subsequently, as shown in FIG. 11C, the decoration member 115 is attached to the sensor attachment unit 114 by fitting the claw portions 115c to the claw reception holes 114a so that the sensing unit 12a and the sensing unit 12b can be exposed through the through-holes 115a and 115b.

The decoration member 115 is positioned on the outermost surface of the illumination device 100 either in the state that the decoration member 115 alone is attached to the sensor attachment unit 114 as shown in FIG. 11A or in the state that both the sensor 12 and the decoration member 115 are attached to the sensor attachment unit 114 as shown in FIG. 11B. Therefore, the outward appearance of the illumination device 100 is not changed by the attachment and detachment of the sensor 12, which improves the design merit. In addition, the connector 14c of the sensor attachment unit 114 is covered with the decoration member 115 against exposure, which enhances the safety.

Fourth Embodiment

A sensor-detachable illumination device in accordance with a fourth embodiment of the present invention will now be described with reference to FIGS. 12A and 13C. The illumination device of the present embodiment differs from that of the third embodiment in that one edge of the decoration member 115 is connected to one edge of the sensor attachment unit 114 through a hinge mechanism 140 so that the decoration member 115 can rotate about the hinge mechanism 140.

Figure 12A:
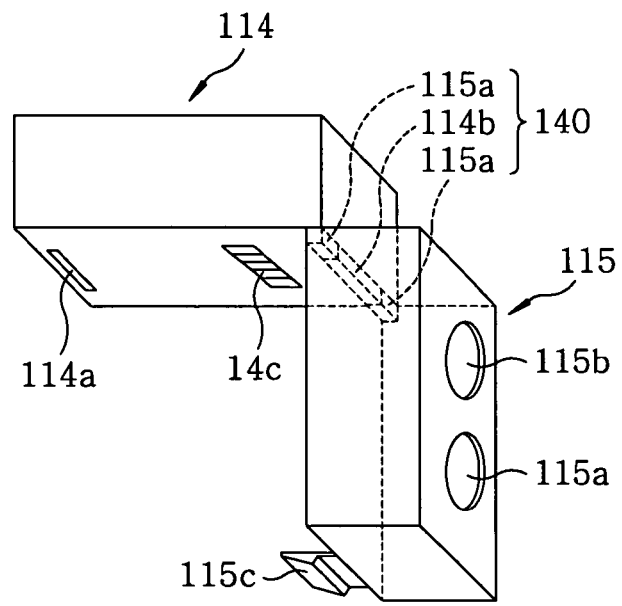
FIG. 12A is an external configuration view showing a sensor attachment unit and a decoration member employed in a sensor-detachable illumination device in accordance with a fourth embodiment of the present invention.
Figure 12B:
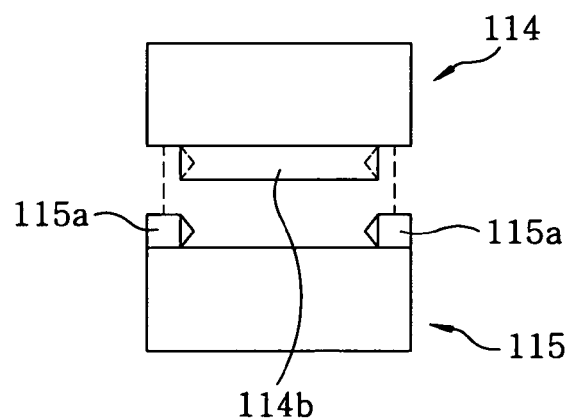
FIG. 12B is an exploded view thereof.

FIGS. 12A and 12B illustrate the sensor attachment unit 114 and the decoration member 115 employed in the illumination device of the present embodiment. The sensor attachment unit 114 has a female hinge portion 114b formed on, e.g., a bottom surface thereof and a claw reception hole 114a formed on the bottom surface in a spaced-apart relationship with the female hinge portion 114b. The decoration member 115 has a pair of male hinge portions 115a formed on one edge thereof and a claw portion 115c formed on the opposite edge to the male hinge portions 115a. The male hinge portions 115a are fitted into the female hinge portion 114b to thereby provide the hinge mechanism 140.

The decoration member 115 is held in the sensor attachment unit 114 by the hinge portion 140 and the claw portion 115c fitted into the claw reception hole 114a. The decoration member 115 is kept connected to the sensor attachment unit 114 and rotatable about the hinge mechanism 140 when the claw portion 115c disengages from the claw reception hole 114a.

Figure 13A:
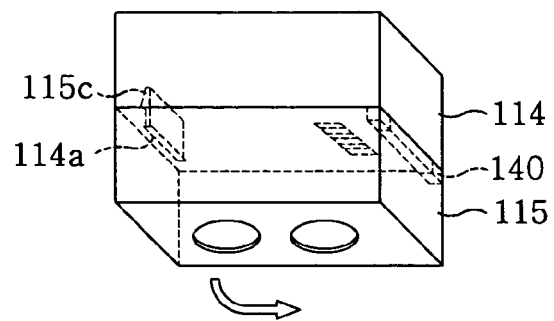
FIGS. 13A through 13C are perspective views illustrating the time-series sequence in which a sensor is attached to the sensor attachment unit in the illumination device of the fourth embodiment.
Figure 13B:
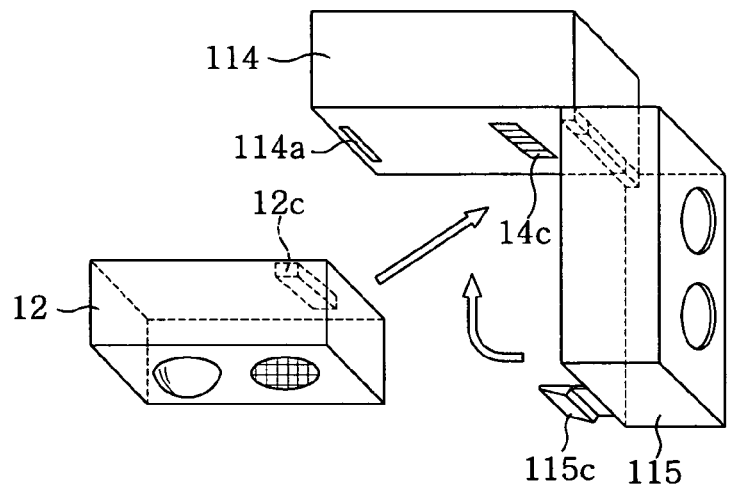
Figure 13C:
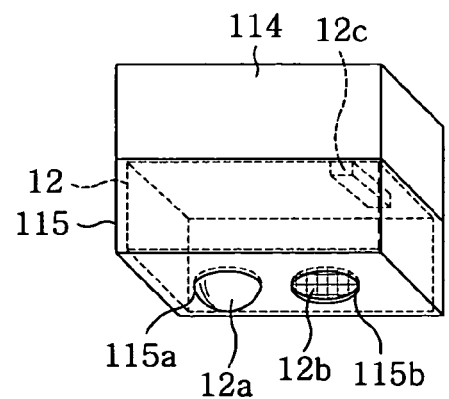

FIGS. 13A through 13C illustrate the time-series sensor attachment sequence starting with the state in which the decoration member 115 alone is attached to the sensor attachment unit 114 and ending with the state in which both the sensor 12 and the decoration member 115 are attached to the sensor attachment unit 114. As shown in FIG. 13A, the decoration member 115 is detached from the sensor attachment unit 114 as it is swung about the hinge mechanism 140 after disengagement of the claw portion 115c from the claw reception hole 114a. Referring next to FIG. 13B, the sensor 12 is attached to the sensor attachment unit 114, and the connector 12c is electrically connected to the connector 14c. Subsequently, as shown in FIG. 13C, the decoration member 115 is attached to the sensor attachment unit 114 by rotating the same about the hinge mechanism 140 in the direction opposite to the detachment direction thereof and then resiliently fitting the claw portion 115c into the claw reception hole 114a so that the sensing unit 12a and the sensing unit 12b can be exposed through the through-holes 115a and 115b.

The decoration member 115 is kept connected to the sensor attachment unit 114 through the hinge mechanism 140 when it is detached from the sensor attachment unit 114 for the attachment and detachment of the sensor 12. This eliminates the need to separately store the decoration member 115 to avoid probable loss thereof, which enhances the user's workability.

Fifth Embodiment

Figure 14A:
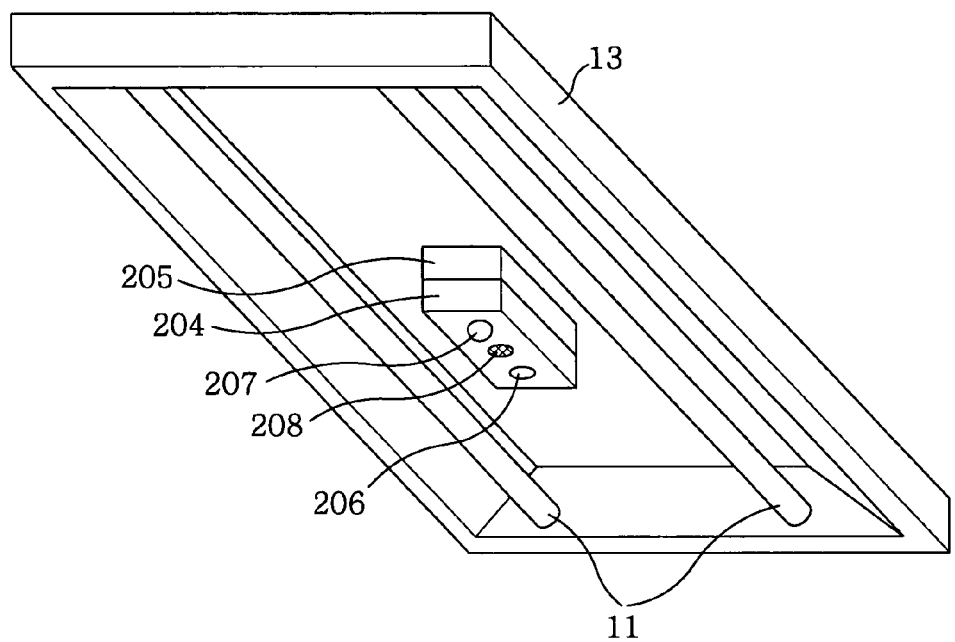
FIG. 14A is a perspective view showing a sensor-detachable illumination device in accordance with a fifth embodiment of the present invention, in which a sensor block is attached to the illumination device.
Figure 14B:
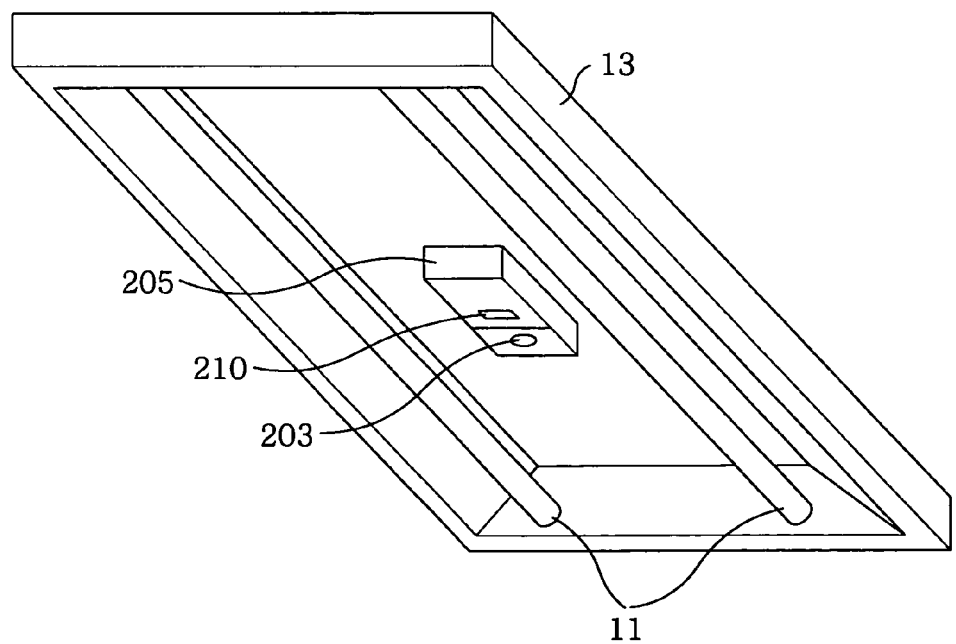
FIG. 14B is a perspective view thereof, in which the sensor block is detached from the illumination device.
Figure 15:
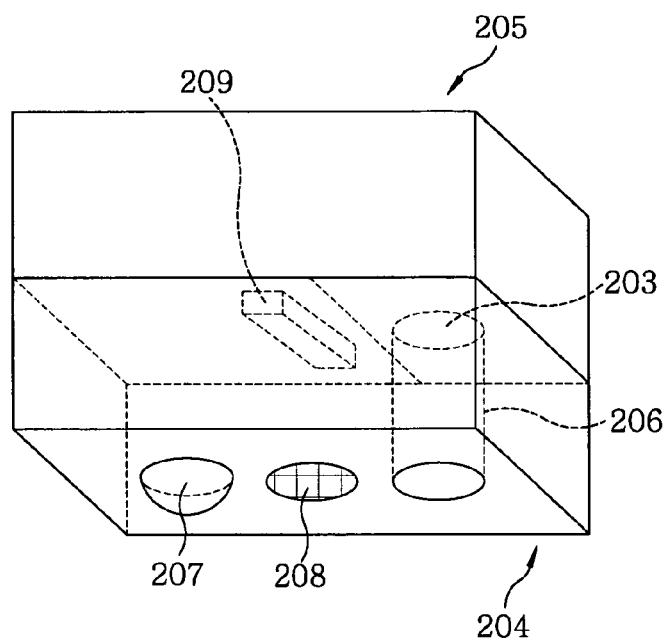
FIG. 15 is a perspective view illustrating a state that the sensor block is attached to the sensor attachment unit in the illumination device of the fifth embodiment.
Figure 16:
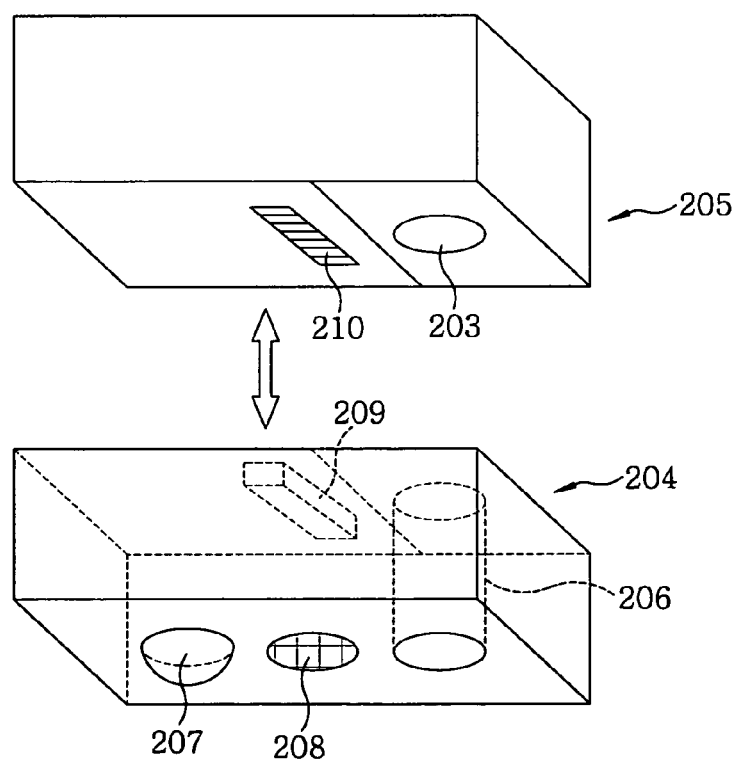
FIG. 16 is a perspective view illustrating a state that the sensor block is detached from the sensor attachment unit in the illumination device of the fifth embodiment.

A sensor-detachable illumination device 201 in accordance with a fifth embodiment of the present invention will now be described with reference to FIGS. 14A to 18. FIGS. 14A and 14B show the outward appearance of the illumination device 201 of the present embodiment, while FIGS. 15 and 16 illustrate the outward appearance of the sensor block 204 and the sensor attachment unit 205 to be set forth below. The illumination device 201 includes a device housing 13 with illumination lamps 11, a remote control signal receiving unit 203 for receiving a remote control signal used in changing the lighting state of the illumination lamps 11, a sensor block 204 as a plug-in sensor for controlling the lighting operation of the illumination lamps 11 and a sensor attachment unit 205 as an installation base for detachably holding the sensor block 204. The remote control signal, which may be infrared rays or radio waves, is sent from a remote control terminal (not shown) operated by a user.

The illumination device 201 further includes a lighting control circuit 211 (see FIG. 17) arranged within the device housing 13. Responsive to the remote control signal received in the remote control signal receiving unit 203 or the sensor signal fed from the sensor block 204, the lighting control circuit 211 performs lighting control, e.g., on-off control, phase control and pulse width control, with respect to the illumination lamps 11.

The remote control signal receiving unit 203 is provided on the sensor attachment unit 205 and is installed substantially at the center of the illumination device 201. This helps prevent interference between the remote control signals transmitted to the remote control signal receiving unit 203 and other illumination devices. Installation of the remote control signal receiving unit 203 on the sensor attachment unit 205 eliminates the possibility that the wiring lines joining the remote control signal receiving unit 203 and the sensor attachment unit 205 to the lighting control circuit 211 (see FIG. 17) become complex, eventually making the illumination device 201 costly. In addition, there is no need to form a large number of holes in the device housing 13, which leads to increased work efficiency. From the standpoint of design merit, it is more desirable to arrange the remote control signal receiving unit 203 and the sensor attachment unit 205 in one position than to separate them from each other.

The sensor block 204 is attached to the sensor attachment unit 205 so as to cover the surface of the sensor attachment unit 205 and also to overlap with the surface of the remote control signal receiving unit 203. The sensor block 204 is provided with a conduction portion 206 that overlaps with the surface of the remote control signal receiving unit 203 when the sensor block 204 is attached to the sensor attachment unit 205. The conduction portion 206 is formed of a tubular hole extending through the sensor block 204 in the up-and-down direction. The remote control signal is delivered to the remote control signal receiving unit 203 via the conduction portion 206.

The sensor block 204 includes a human sensing unit 207 for sensing the presence of a person with a heat ray sensor or the like, a brightness sensing unit 208 for measuring the brightness through the use of a photodiode as an element for converting light to an electric current, and a connector 209 electrically connected to the sensor attachment unit 205. The opening of the conduction portion 206, the human sensing unit 207 and the brightness sensing unit 208 are provided in the same height positions on the surface of the sensor block 204.

The sensor attachment unit 205 is provided with a connector 210 for electrical connection with the connector 209 of the sensor block 204 and is held in the device housing 13. The remote control signal receiving unit 203 is positioned at the same height as the surface of the sensor attachment unit 205. Thus the surface of the sensor attachment unit 205 and the surface of the remote control signal receiving unit 203 are substantially flush with each other. The sensor block 204 and the sensor attachment unit 205 are provided with holder structures by which the sensor block 204 is held in the sensor attachment unit 205. As the holder structures, it may be possible to use, e.g., mutually separable engagement structures formed in the sensor block 204 and the sensor attachment unit 205 or magnetically couplable structures including a permanent magnet and an iron piece. Alternatively, the connectors 209 and 210 may serve as the holder structures for holding the sensor block 204 in the sensor attachment unit 205.

Each of the connectors 209 and 210 includes a power supply terminal for supplying an electric current from the device housing 13 to the sensor block 204 through the sensor attachment unit 205 and a signal terminal for transmitting the sensor signal from the sensor block 204 to the lighting control circuit 211 (see FIG. 17) of the device housing 13 through the sensor attachment unit 205. The connectors 209 and 210 are electrically connected to each other when the sensor block 204 is attached to the sensor attachment unit 205. The power supply terminal of the connector 210 works as a charging terminal. In order to keep the charging terminal from protruding from the sensor attachment unit 205, it is desirable to form the connector 210 as a female connector and the connector 209 as a male connector.

Figure 17:
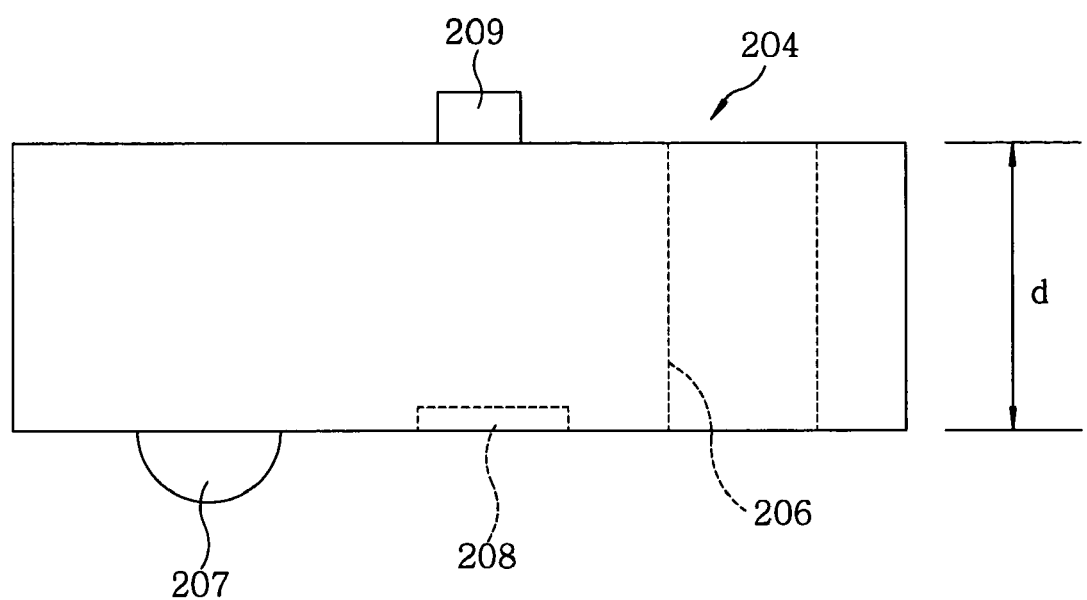
FIG. 17 is a side view showing the sensor block employed in the illumination device of the fifth embodiment.

FIG. 17 is a side view showing the sensor block 204. In case where the thickness d of the sensor block 204 is relatively small, the remote control signal moves through the conduction portion 206 and arrives at the remote control signal receiving unit 203. If the thickness d of the sensor block 204 is relatively great, the remote control signal is reflected and diffused while passing through the conduction portion 206 and is received by the remote control signal receiving unit 203.

Figure 18:
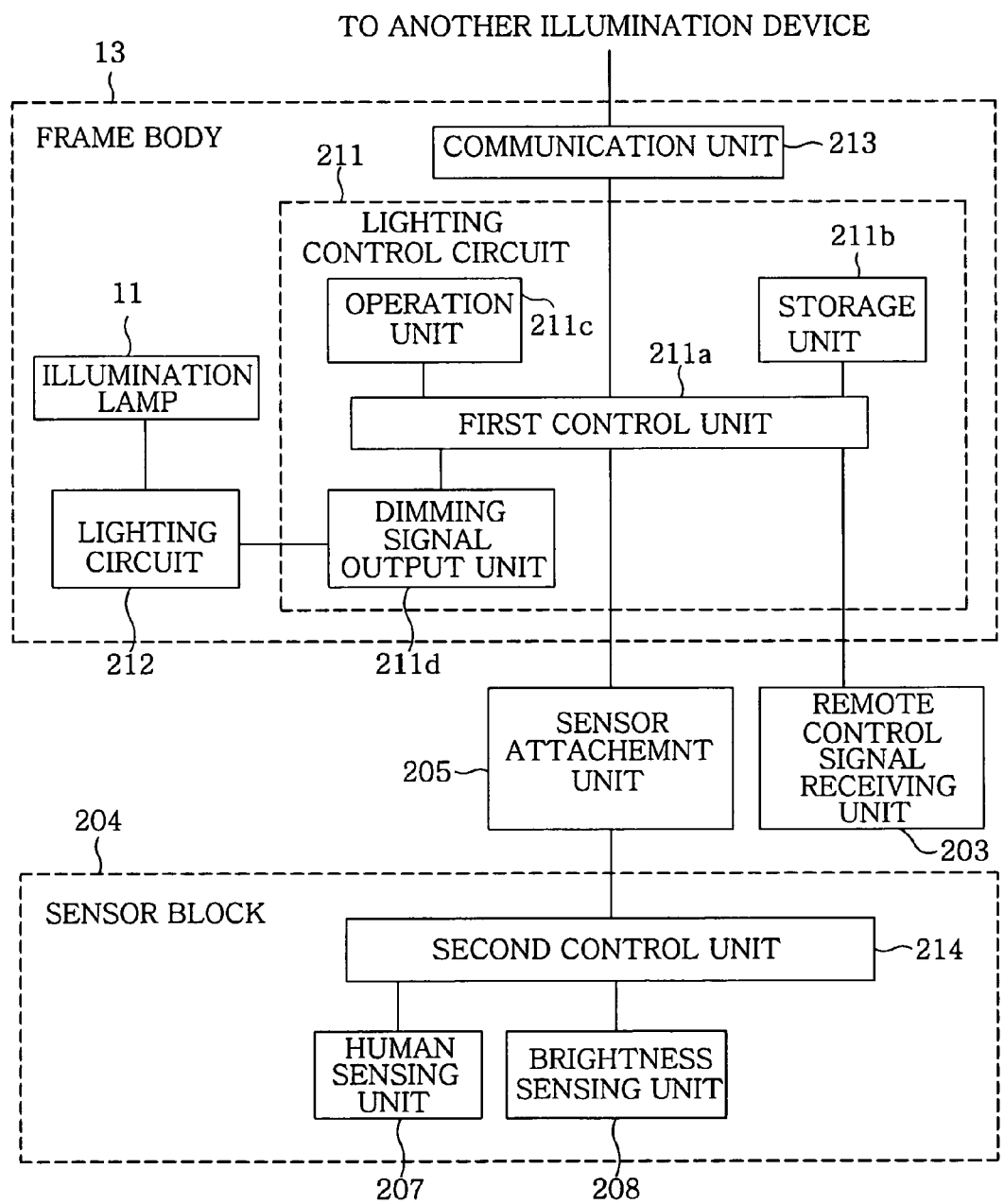
FIG. 18 is a block diagram showing an electrical configuration employed in the illumination device of the fifth embodiment.

FIG. 18 shows the electrical configuration of the illumination device 201. The device housing 13 includes the lighting control circuit 211, a lighting circuit 212 for supplying electric power to the illumination lamp 11 in response to the dimming signal outputted from the lighting control circuit 211, and a communication unit 213 that interlocks the illumination device 201 with another illumination device by serial communication. The communication unit 213 may be, e.g., a serial signal line or a wireless communication system, and serves to transmit the dimming signal outputted from the lighting control circuit 211 to another illumination device.

The lighting control circuit 211 includes a first control unit 211a for determining the dimming rate of the illumination lamp 11, a storage unit 211b for storing the information required in dimming the illumination lamp 11, an operation unit 211c for performing, e.g., an operation of averaging the values measured by the brightness sensing unit 208, and a dimming signal output unit 211d for converting the dimming rate to a dimming signal and outputting the dimming signal to the lighting circuit 212. The first control unit 211a performs the determination of dimming rate based on the sensor signal transmitted from the sensor block 204 and the preset conditions. The storage unit 211b stores a target brightness value used in performing the control of keeping the brightness constant at all times, a lighting time maintained in case of detecting a person, and other information. If the addresses or group numbers of other illumination devices to be interlocked are stored in the storage unit 211b, it becomes possible to control the lighting operations of a plurality of illumination devices with a reduced number of sensor blocks.

The remote control signal receiving unit 203 receives the remote control signal transmitted from a remote control terminal and sends the same to the first control unit 211a. The sensor block 204 includes the human sensing unit 207, the brightness sensing unit 208 and a second control unit 214 by which the sensor signal indicative of the presence or absence of a person or the measured brightness value transmitted from the sensing units 207 and 208 is converted to a signal to be sent to the first control unit 211a. The signal converted by the second control unit 214 is transmitted to the first control unit 211a of the device housing 13 through the sensor attachment unit 205.

By receiving the sensor signal transmitted from the sensor block 204, the first control unit 211a recognizes that the sensor block 204 is attached to the sensor attachment unit 205. If the sensor signal is not received within a predetermined time period, the first control unit 211a recognizes that the sensor block 204 is detached from the sensor attachment unit 205. Alternatively, the sensor block 204 may continue to transmit its sensor information. In this case, the first control unit 211a may recognize attachment of the sensor block 204 upon reception of the sensor information and may recognize detachment of the sensor block 204 upon failure to receive the sensor information within a predetermined time period.

Description will now be made on the operation of the illumination device 201 configured as above. Referring back to FIGS. 15 and 16, if a user wishes to control the illumination device 201 through the use of a sensor, the sensor block 204 is attached to the sensor attachment unit 205 so that the conduction portion 206 can overlap with the surface of the remote control signal receiving unit 203 while the connectors 210 and 209 are connected to each other. In this state, the remote control signal receiving unit 203 is not exposed to the outside. When the sensor block 204 is detached from the sensor attachment unit 205, the surface of the sensor attachment unit 205 and the surface of the remote control signal receiving unit 203 are substantially flush with each other. Therefore, the remote control signal receiving unit 203 does not protrude from the surface of the sensor attachment unit 205. This reduces the change in the outward appearance of the illumination device 201 caused by the attachment and detachment of the sensor block 204, consequently improving the design merit.

When the sensor block 204 is attached to the sensor attachment unit 205, the remote control signal transmitted from the remote control terminal operated by a user enters the opening of the conduction portion 206 and arrives at the remote control signal receiving unit 203 through the conduction portion 206. Thus the remote control signal is delivered to the remote control signal receiving unit 203 with no interruption, which enhances the reliability of remote control communication.

Sixth Embodiment

A sensor-detachable illumination device in accordance with a sixth embodiment of the present invention will now be described with reference to FIGS. 19 through 21. The illumination device of the present embodiment differs from that of the fifth embodiment in the configuration of the conduction portion 206 of the sensor block 204. A light guide body 206a as an optical member, e.g., an optical fiber, is filled in the hole of the conduction portion 206.

Figure 19:
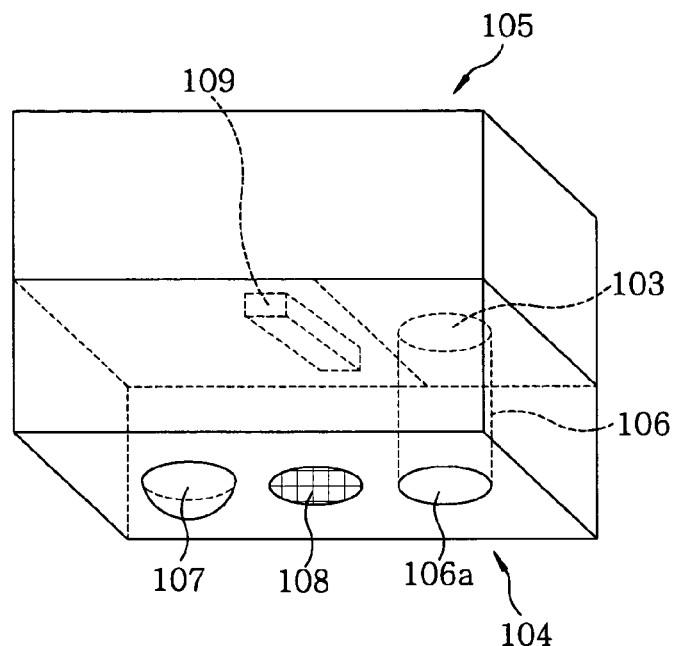
FIG. 19 is a perspective view showing a sensor-detachable illumination device in accordance with a sixth embodiment of the present invention, in which a sensor block is attached to the sensor attachment unit.
Figure 20:
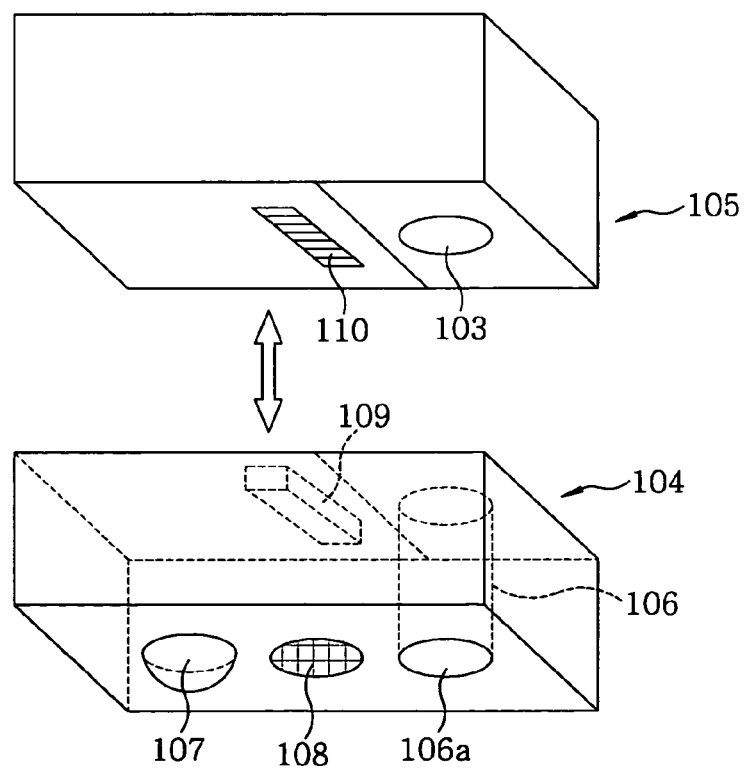
FIG. 20 is a perspective view illustrating a state that the sensor block is detached from the sensor attachment unit in the illumination device of the sixth embodiment.
Figure 21:
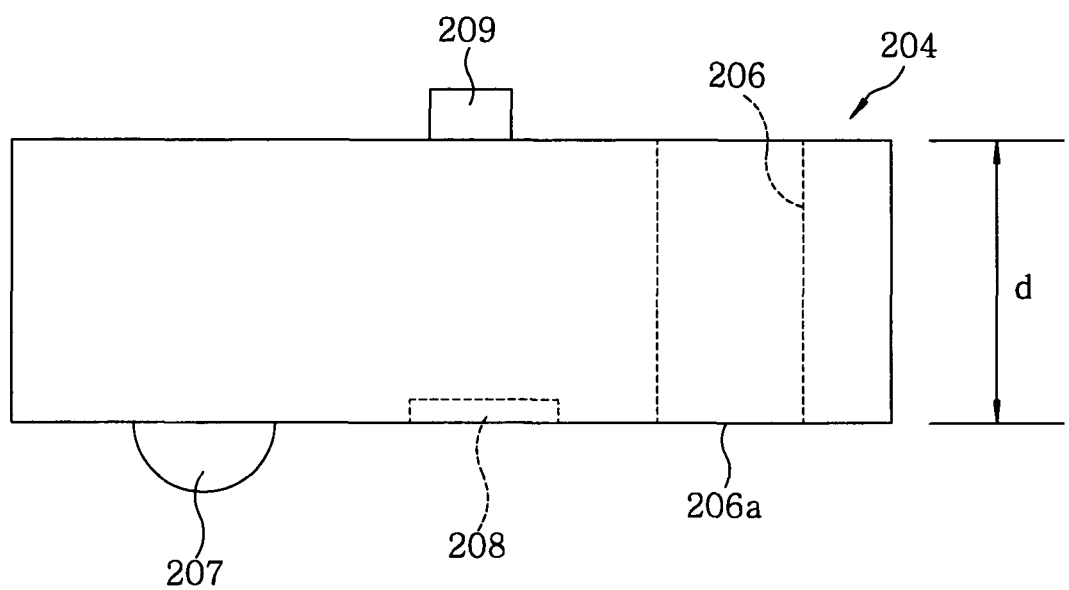
FIG. 21 is a side view showing the sensor block employed in the illumination device of the sixth embodiment.

FIGS. 19 and 20 show the outward appearance of the sensor block 204 and the sensor attachment unit 205 employed in the illumination device 201 of the present embodiment, and FIG. 21 is a side view of the sensor block 204. The conduction portion 206 of the sensor block 204 becomes a light guide way as the light guide body 206a is filled therein.

In the present embodiment, the remote control signal for communication that makes use of light such as infrared rays is fully reflected in the light guide body 206a regardless of the thickness d of the sensor block 204 and is delivered to the remote control signal receiving unit 203 through the conduction portion 206 as a light guide way. This reduces diffusion of the remote control signal during the time when the latter passes through the conduction portion 206, thereby enhancing the reliability of remote control communication. In particular, use of infrared rays as the remote control signal further enhances the reliability of remote control communication.

Seventh Embodiment

A sensor-detachable illumination device in accordance with a seventh embodiment of the present invention will now be described with reference to FIGS. 22A through 24. In the present embodiment, the sensor block 204 includes an additional remote control signal receiving unit 215 in place of the conduction portion 206 employed in the fifth and sixth embodiments.

Figure 22A:
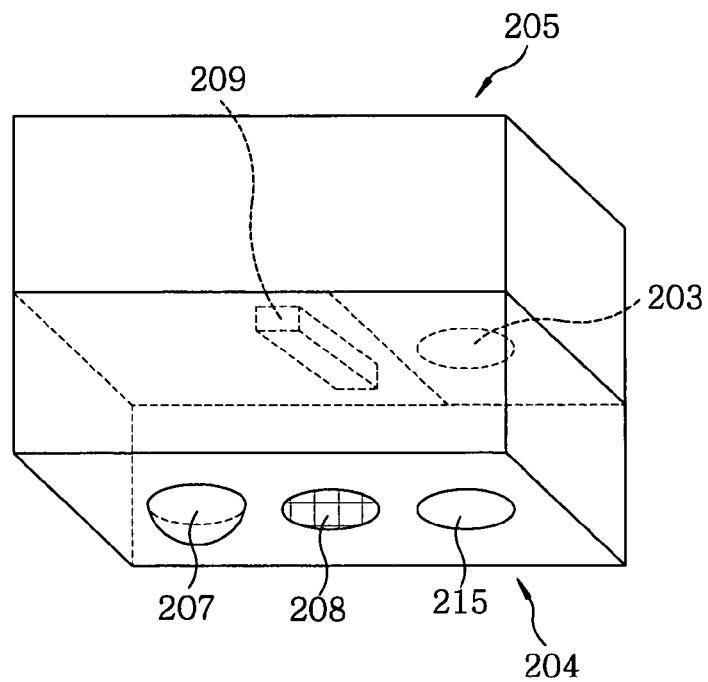
FIG. 22A is a perspective view showing a sensor-detachable illumination device in accordance with a seventh embodiment of the present invention, in which a sensor block is attached to the sensor attachment unit.
Figure 22B:
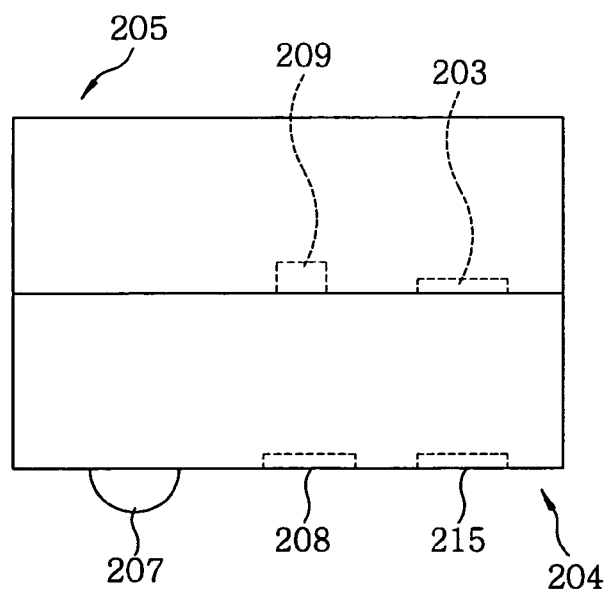
FIG. 22B is a side view thereof.
Figure 23:
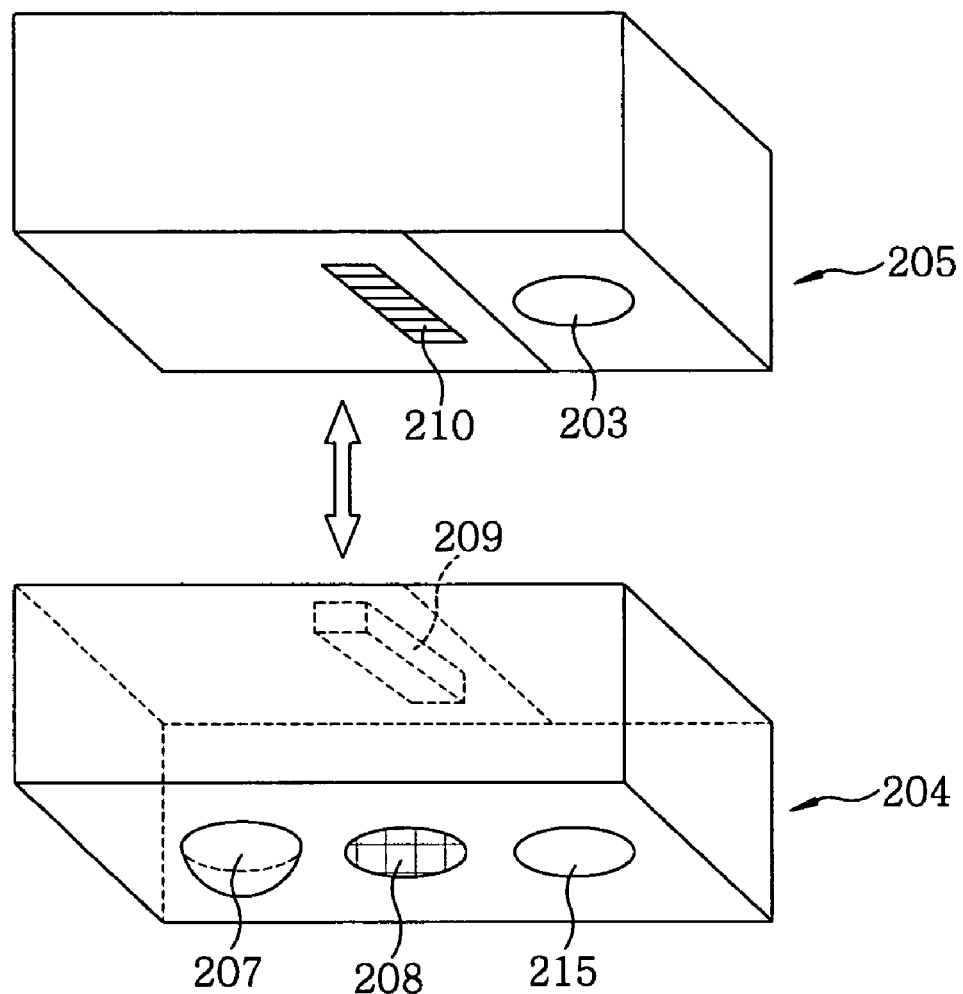
FIG. 23 is an external configuration view illustrating a state that the sensor block is detached from the sensor attachment unit in the illumination device of the seventh embodiment.

FIGS. 22A, 22B and 23 show the outward appearance of the sensor block 204 and the sensor attachment unit 205 of the illumination device 201. As mentioned above, the sensor block 204 includes a remote control signal receiving unit 215 in place of the conduction portion 206. The remote control signal receiving unit 215, the human sensing unit 207 and the brightness sensing unit 208 are provided in the same height positions on the surface of the sensor block 204. When the sensor block 204 is attached in place, the remote control signal is received by the remote control signal receiving unit 215 instead of the remote control signal receiving unit 203 provided in the sensor attachment unit 205. This means that, unlike the conduction portion 206 set forth above, there is no need to provide the remote control signal receiving unit 215 in alignment with the remote control signal receiving unit 203.

Figure 24:
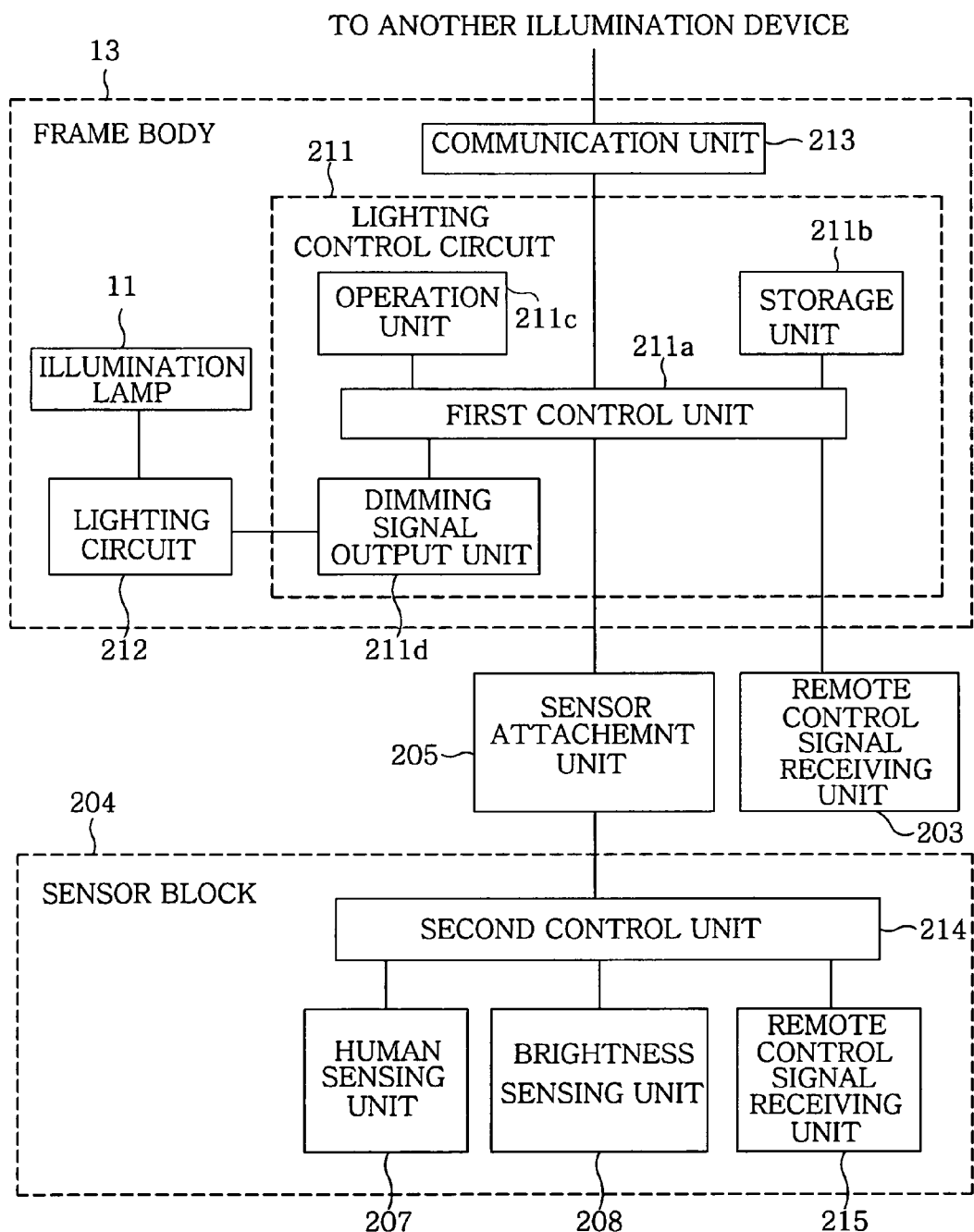
FIG. 24 is a block diagram showing an electrical configuration employed in the illumination device of the seventh embodiment.
Figure 25:
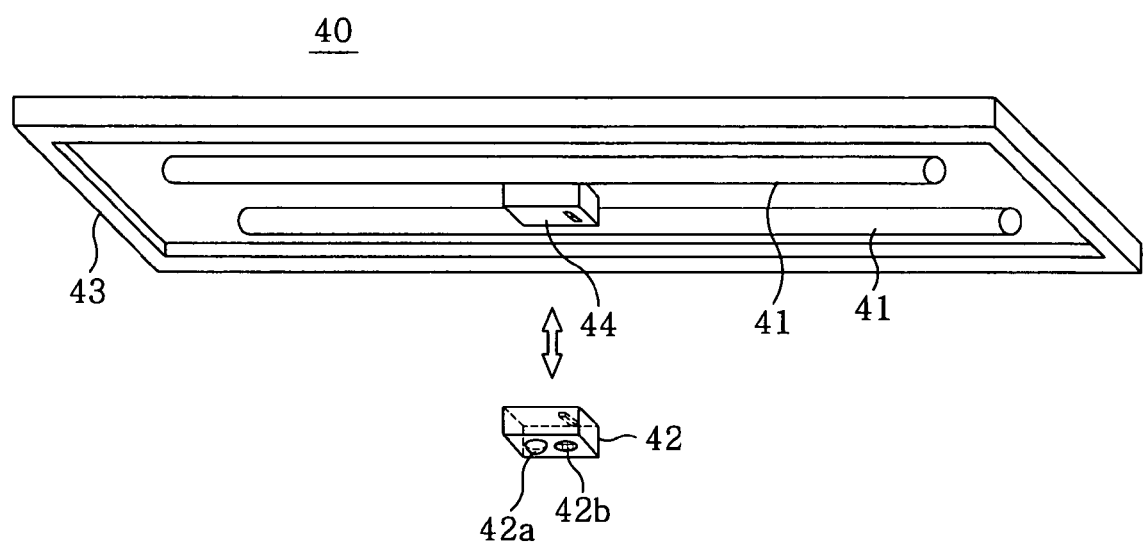
FIG. 25 is a perspective view showing a conventional sensor-detachable illumination device.
Figure 26A:
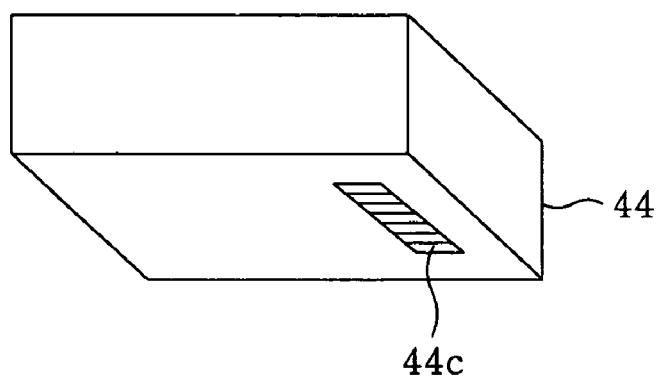
FIG. 26A is a perspective view showing a sensor attachment unit employed in the conventional illumination device.
Figure 26B:
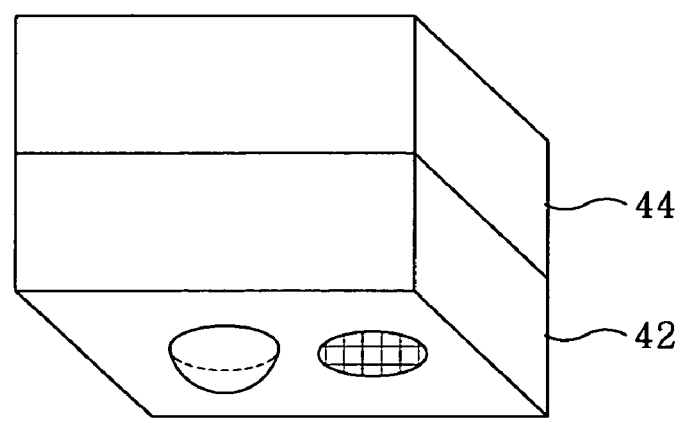
FIG. 26B is a perspective view showing the sensor attachment unit to which a sensor is attached.

FIG. 24 shows the electrical configuration of the illumination device 201 of the seventh embodiment. The sensor block 204 includes the remote control signal receiving unit 215, the human sensing unit 207, the brightness sensing unit 208 and the second control unit 214 by which the remote control signal and the sensor signal transmitted from remote control signal receiving unit 215 and the sensing units 207 and 208 are converted to signals to be sent to the first control unit 211a. The signals converted by the second control unit 214 are transmitted to the first control unit 211a of the device housing 13 through the sensor attachment unit 205.

As described above, the first control unit 211a determines whether the sensor block 204 is attached in place. If the determination reveals that the sensor block 204 is attached, the first control unit 211a allows the remote control signal receiving unit 215 of the sensor block 214 to receive the remote control signal. If the determination reveals that the sensor block 204 is detached, the first control unit 211a allows the remote control signal receiving unit 203 of the sensor attachment unit 205 to receive the remote control signal. There is no need for the first control unit 211a to monitor the remote control signal receiving unit 203 of the sensor attachment unit 205 when the sensor block 204 is attached in place. This eliminates the possibility that the remote control signal receiving unit 203 receives an erroneous signal such as a noise or the like.

Referring back to FIGS. 22A and 22B, the sensor block 204 is attached to the sensor attachment unit 205 so as to cover the remote control signal receiving unit 203. In this state, the remote control signal receiving unit 203 is not exposed to the outside. When the sensor block 204 is detached from the sensor attachment unit 205, the surface of the sensor attachment unit 205 and the surface of the remote control signal receiving unit 203 are substantially flush with each other as can be seen in FIG. 23. Therefore, the remote control signal receiving unit 203 does not protrude from the surface of the sensor attachment unit 205. This reduces the change in the outward appearance of the illumination device 201, consequently improving the design merit. In addition, the remote control signal is received by the remote control signal receiving unit 215 provided on the surface of the sensor block 204, which enhances the reliability of remote control communication.

In the embodiments described above, the remote control signal receiving unit provided in the sensor attachment unit may be detachably attached to the illumination device.

While the invention has been shown and described with respect to the preferred embodiments, it will be understood by those skilled in the art that various changes and modification may be made without departing from the scope of the invention as defined in the following claims.

What is claimed is:

1. An illumination device comprising:
   a device housing;
   an illumination lamp installed to the device housing;
   a sensor for use in controlling the lighting operation of the illumination lamp;
   a sensor attachment unit through which the sensor is detachably attached to the device housing such that a sensing unit of the sensor is exposed to the outside; and
   a decoration member for attachment to the sensor attachment unit when the sensor is not attached to the sensor attachment unit, the decoration member having substantially the same outward appearance as that of the sensor,
   wherein the sensor and the decoration member are interchangeably attached to the sensor attachment unit, and
   wherein the sensor attachment unit includes an installation base to which the sensor or the decoration member is attached and an accommodation portion arranged on one side of the installation base for slidably accommodating the decoration member, the decoration member being slidingly accommodated within the accommodation portion when the sensor is attached to the installation base.

* * * * *